Figure 1:
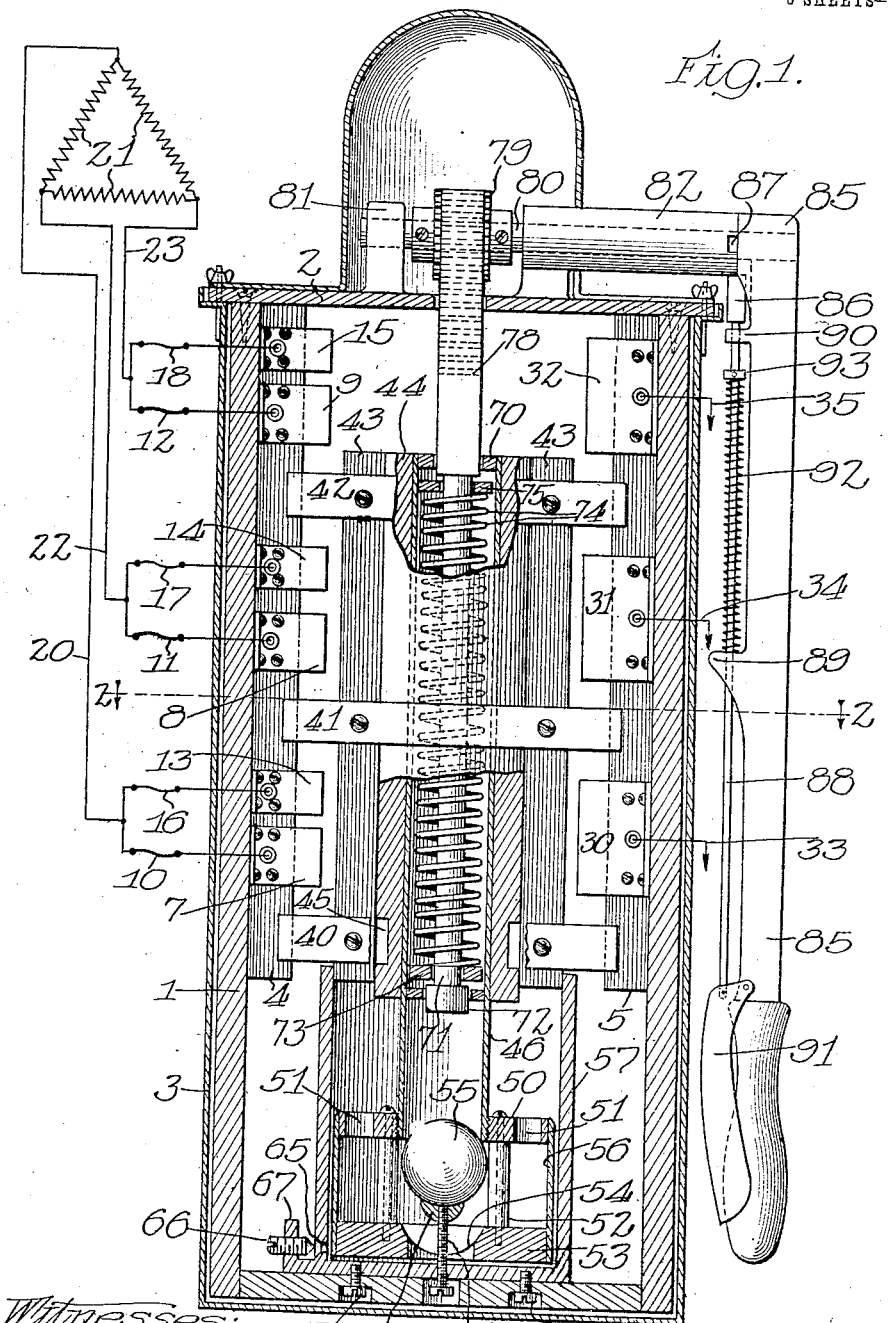

A. C. McWILLIAMS.
MOTOR STARTER.
APPLICATION FILED FEB. 19, 1912.

1,121,567.

Patented Dec. 15, 1914.
3 SHEETS—SHEET 1.

Witnesses:
Inventor:
Arthur C. McWilliams
By Cheever & Cox
Attys

A. C. McWILLIAMS.
MOTOR STARTER.
APPLICATION FILED FEB. 19, 1912.
1,121,567.
Patented Dec. 15, 1914.
3 SHEETS—SHEET 2.
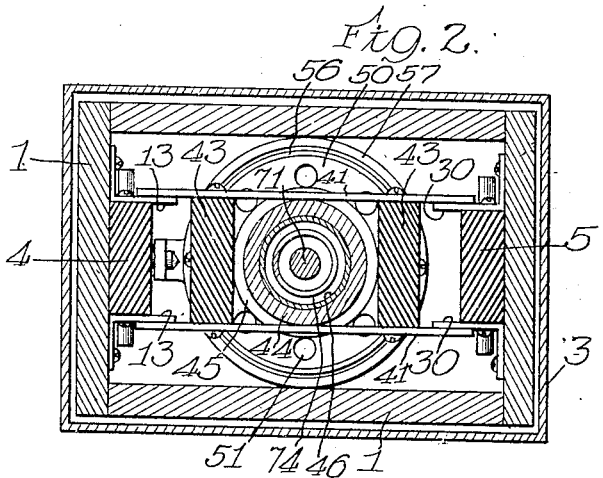
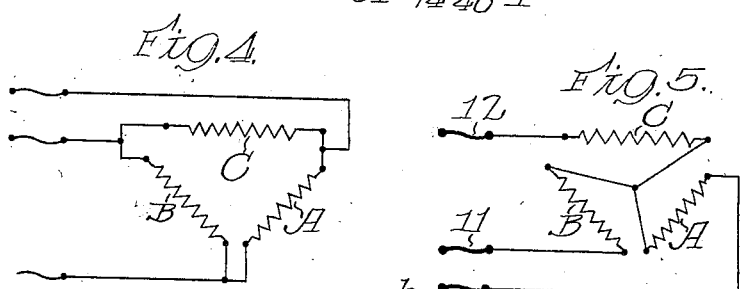
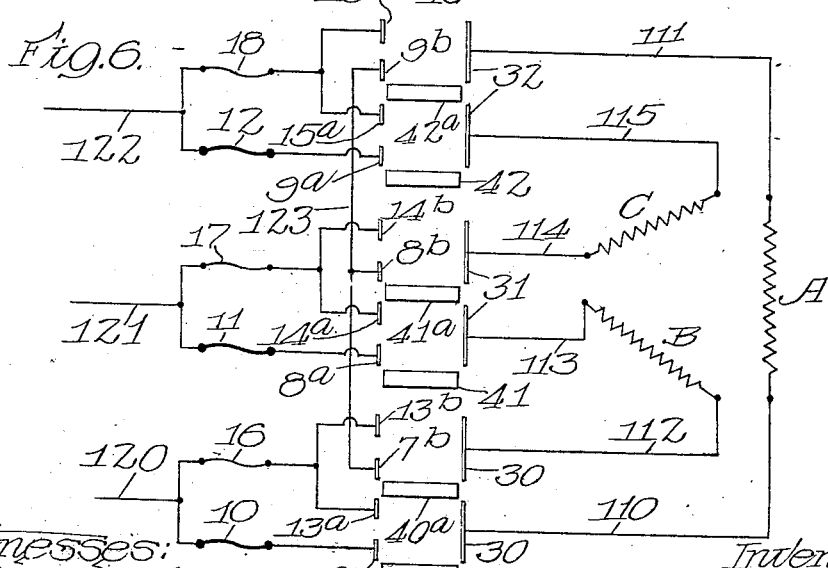
Witnesses:
H. Domarus Jr.
W. T. Smith
Inventor
Arthur C. McWilliams
By Cheever & Cox
Attys

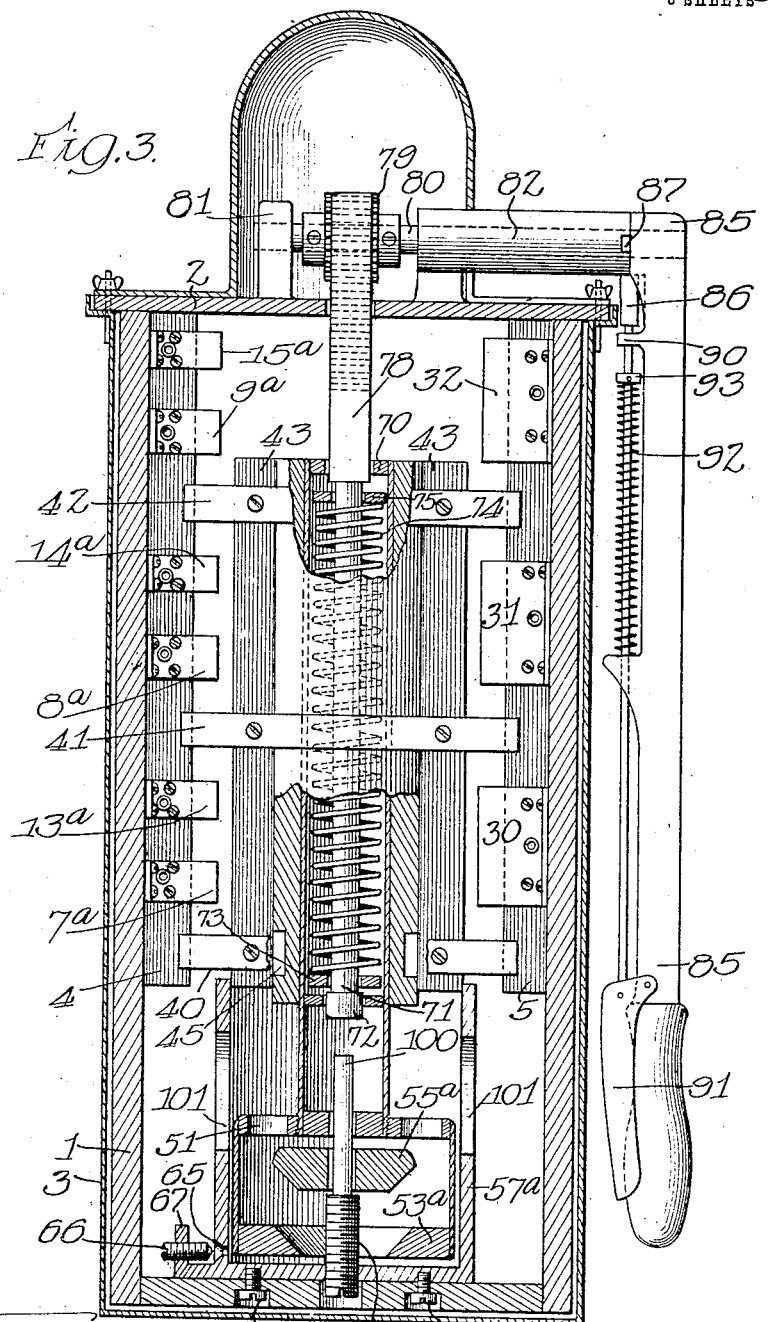

UNITED STATES PATENT OFFICE.

ARTHUR C. McWILLIAMS, OF CHICAGO, ILLINOIS.

MOTOR-STARTER.

1,121,567.

Specification of Letters Patent.    Patented Dec. 15, 1914.

Application filed February 19, 1912. Serial No. 678,463.

*To all whom it may concern:*

Be it known that I, ARTHUR C. MCWILLIAMS, a citizen of the United States, residing at Chicago, in the county of Cook and State of Illinois, have invented a certain new and useful Improvement in Motor-Starters, of which the following is a specification.

It is becoming common practice in operating alternating current motors to dispense with special starting devices, and to rely merely upon switches. In small motors of five horse power or under no special provision is made against a rush of current into the motor when it is starting, for the currents dealt with are comparatively small and ordinarily no harm will be done by turning on the full voltage directly on to the motor. In motors above five horse power some device is necessary in order that the initial rush of current may not produce an undue strain on the motor that is starting or the generating apparatus which supplies it. As the flow of current, however, in all alternating current motors is greater at the start than it is after the motor has attained its normal speed, it is customary to provide two sets of fuses, to-wit, a "starting" set having comparatively large capacity and a "running" set having normal capacity. Each set has its own terminal, and the attendant in starting up first switches on the supply current through the starting terminals and fuses and then after the motor attains its speed switches over to the running terminals. In the larger motors, for three wire alternating systems, six terminals are provided and these are so connected to the coils that three of the terminals will give a star connection, and the other three a delta connection. Motors constructed in this way are termed "star-delta" motors. In starting them the terminals first employed are the ones which give a star connection for this increases the resistance effect and reduces the voltage to about fifty-eight per cent. of what it would be with the delta winding. After the motor has attained speed the attendant switches over to the terminals which give the delta connection. Thus it will be seen that in these larger motors, also, there is a "starting" set of terminals and a "running" set (and it may be added that with these larger motors as well as with the smaller ones it is usual to provide larger capacity fuses for the starting terminals and normal capacity fuses for the running terminal). Single phase alternating current motors are also provided with both starting and running terminals for similar reasons. In either of the cases above mentioned the attendant has to wait for the motor to attain its speed before he can leave it, which obviously has its disadvantages.

The object of my invention is to provide simple and efficient means for automatically switching over from the starting terminals to the running terminals in the proper manner after the attendant has thrown in the starting connections. Ancillary to this general object it is my purpose to provide means whereby the lapse of time between the throwing in by the attendant and the throwing over by the apparatus may be regulated to suit the particular operating conditions of the place where the motor is installed.

I obtain my objects by the apparatus illustrated in the accompanying drawings, in which—

Figure 1 is a general sectional elevation of my starter in the form adapted for the smaller motors. Fig. 2 is a horizontal section thereof on line 2—2, Fig. 1. Fig. 3 is a vertical section of my starter especially adapted for the larger motors. This view also shows certain modifications in the form of check valve. Figs. 4 and 5 illustrate the well known delta and star connections respectively, and Fig. 6 is a diagram showing the connections for one of the larger motors provided with "star-delta" connections.

Similar reference characters refer to similar parts throughout the several views.

First considering the apparatus of the form shown in Figs. 1 and 2, which is suitable for small motors; a box 1 having a cover 2 both consisting preferably of wood is inclosed within an outer casing 3 which consists preferably of sheet metal. The box and casing are adapted to be filled with oil when the apparatus is in use. On opposite walls of the box are fastened blocks 4 and 5 consisting of wood or other insulating material. On the front of block 4, at the left, Figs. 1 and 2, are three starting terminals 7, 8 and 9 connected to "starting" fuses 10, 11, 12 respectively, and three running terminals 13, 14 and 15 connected to "running" fuses 16, 17, 18 respectively.

Each starting terminal is associated with a running terminal, as shown, the running terminal being located above each starting terminal. In other words, the starting and running terminals are arranged in pairs; and ordinarily there are three pairs on the front of the block and three on the back for a second similar set of connections hereinafter mentioned.

The fuses 10, 16 are connected through a conductor 20 to one corner of the motor winding 21. Fuses 11 and 17 are connected by conductor 22 to another corner of said winding, and fuses 12 and 18 are connected by a conductor 23 to another corner of said winding. On block 5 at the right, Figs. 1 and 2, are fastened three elongated terminals 30, 31, 32. These in the present instance are connected by conductors 33, 34 and 35 respectively to the different branches of a three wire circuit from which the source of energy is obtained. These terminals and connections are also duplicated on the back of the block. Three connector bars 40, 41 and 42 are secured to the front of a frame, which in the present design consists of a pair of wooden strips 43 having between them a hollow wooden cylinder 44 having horizontal grooves 45 therein for receiving said bars. Within cylinder 44 is secured a tubular metallic casing 46. The parts 40 to 46 inclusive move as a single structure and the relation of the parts is such that when this structure moves upward the bars 40, 41, 42 establish connections between the terminals 30, 31, 32 on the one side and the proper terminals 7, 8, 9, 13, 14, 15 on the other. Connector bars 40ᵃ, 41ᵃ and 42ᵃ are fastened to the back of the frame to engage terminals arranged similarly to those in front. It will be noted that in this, the preferred construction, the connector bars move parallel to themselves, and thus break contact at both ends. This double break in oil affords maximum safety.

The tube 46 above mentioned projects downward below the rest of the structure of which it is a part and carries at the lower end a plunger which consists in the present design of a disk 50 having a number of apertures 51 therein and secured by a hollow cylindrical casing 56 to a lower disk 53 which has an aperture 54 forming a seat for a check valve 55. Said casing makes a reasonably close fit within the cylinder 57 which is secured to the bottom of box 1 by screws 58 or otherwise, and practically constitutes a dash pot taken in connection with the plunger just described. A valve stop is located at the bottom of cylinder 57 and according to the present design consists of a cup 60 fastened to the top of an adjusting screw 61 screwing into the bottom of cylinder 57. This stop prevents the ball valve 55 from descending beyond a certain point, the cage having a further downward movement after the valve is arrested. Said valve is guided to its seat by posts 52 extending from disk 50 to disk 53. At the bottom of cylinder 57 is an inlet 65 adjacent to which is an adjustable screw valve 66 carried by a lug 67 which is preferably formed integral with the cylinder. The flow through said inlet may be regulated by screwing valve 66 toward or from it. Tube 46 has a disk 70 secured at its upper end, this being apertured to receive a rod 71 which extends downward in said tube. Said rod has a head 72 at its lower end which supports a disk 73 which in turn supports a compression spring 74 which encircles rod 71. Resting upon said spring is a disk 75 which is adapted to support the disk 70 and through it the connector bars and associated parts.

Rod 71 is fastened at its upper end to a toothed rack 78 meshing with a pinion 79 secured to a shaft 80. Said shaft is journaled in bearings 81 and 82 mounted upon the cover 2. By preference bearing 82 is elongated in the form of a sleeve. The construction of the parts is such that the rotation of shaft 80 will cause the raising or lowering of rack 78 and rod 71. Shaft 80 projects beyond the end of sleeve 82 and is there rigidly fastened to a lever 85 by which the shaft may be rotated. Said lever is provided with a detent 86 adapted to enter notches 87 formed at various points in the end of sleeve 82. The lever may consequently be locked in different positions, preferably with the lever vertically downward and vertically upward. Detent 86 is operated by a rod 88 guided in lugs 89, 90 formed upon said lever. Said rod is operated by a hand grip 91 pivoted to the lever and rod 88 is urged toward sleeve 82 by a spring 92 abutting lug 89. The other end of spring 92 abuts collar 93 fastened to said rod.

In operation, when the motor is standing still the parts occupy the position shown in Fig. 1 with the handle 85 extending vertically downward or "downright," the connector bars 40, 41 and 42 down out of contact with their respective terminals, the plunger 50, 52, 53, 56 down, and check valve 55 seated upon stop 60 some distance above its valve seat. When the attendant wishes to start up he throws the lever 85 to a position vertically upward, permitting detent 86 to enter such of the notches 87 as will hold the lever in this upright position. This movement of the lever rotates the pinion 79 and lifts rack 78 and rod 71. This causes upward pressure on the lower end of spring 74 which in turn exerts upward pressure upon the framework comprising the strip 43, cylinder 44, tube 46 and connector bars 40, 41, 42. As aperture 54 is open at the beginning of the upward movement of the parts the oil within cylinder 57 readily flows through it and offers little or no retarding action to such upward movement. As soon as valve 55 is reached, however, it closes aperture 54, after which no oil can enter the lower part of the cylinder except through the inlet 65. As this inlet is comparatively small or may be made so by partially closing the valve 66, the subsequent upward movement of the parts will be comparatively slow. The parts are so proportioned, practically, that the quick initial upward movement brings the connector bars from normal non running position shown in Fig. 1 up into full engagement with the starting terminals 7, 8, 9 and elongated terminals 30, 31, 32. Thereafter the rate of upward movement is slow, the valve 66 being so adjusted that the bars will not leave the starting terminals until the motor has attained its normal speed. In Fig. 1 the starting and running terminals are so close together that the connector bars will engage the running terminals before leaving the starting ones. This is not essential but is ordinarily permissible with a motor wound as indicated, for both the starting and running terminal of a given pair are connected to the same point in the motor winding.

When the attendant wishes to shut down the motor he rotates the lever from upright to downright position. This instantly returns the parts to normal non running position shown in Fig. 1, for the valve 55 is kept open by the uprush of the oil through aperture 54, and, therefore, there is nothing to hinder the lowering of the parts. It will be noted that in this preferred construction the lever 85 will be down when the motor is still and up when the motor is running. The lever itself, therefore, serves as indicator visible at a distance to show a distant attendant whether this particular motor is running or not.

The principle of construction and operation of the form of apparatus shown in Figs. 3, 4, 5 and 6 is substantially the same as in the form above described. The modification resides in the increased distance between the starting and running terminals to prevent short circuiting, and the manner of connecting the terminals to the motor windings to produce the star-delta connection. There is another modification here shown which is applicable to either form of device, to-wit, the plunger in the dash pot cylinder here has a disk valve instead of the ball valve shown in Fig. 1. In this modified form the disk 53ᵃ, which corresponds to disk 53 of Fig. 1, is adapted to seat a disk valve 55ᵃ, said valve being supported upon a stop 61ᵃ screwing in the bottom of the cylinder 57ᵃ. Valve 55ᵃ is centrally apertured to receive and be guided by a stem 100 extending upward from stop 61ᵃ. Cylinder 57ᵃ has relief apertures 101 formed in its sides near the upper end. The purpose of these is to let the oil rush into the cylinder as soon as the bottom of disk 53ᵃ has reached the bottom of said apertures. This permits the connector bars to again move rapidly after they have left the starting terminals 7ᵃ, 8ᵃ, 9ᵃ. Thus there is no appreciable interval between leaving of the starting terminals and making complete contact with the running terminals.

Now considering the wiring connections for the form of apparatus shown in Fig. 3: The delta connection is shown in Fig. 4 and the star connection in Fig. 5. The general wiring connections for producing first a star and then a delta connection of the coils of the motor are shown in the diagram, Fig. 6. The three connector bars 40, 41 and 42 are located on the front of the strips 43 while the connector bars 40ᵃ, 41ᵃ and 42ᵃ are similarly arranged on the back of said strips. Let A, B, C, represent the three sets of coils of a star-delta motor. Coil A is connected at one end by a conductor 110 to one of the terminals 30 and at the other end by a conductor 11 to one of the terminals 32. Coil B is connected at one end by a conductor 112 to the remaining terminal 30 and at the other end by a conductor 113 to one of the terminals 31. Coil C is connected at one end by a conductor 114 to the remaining terminal 31 and at the other end by a conductor 115 to the remaining terminal 32. The starting terminals 7ᵃ, 8ᵃ, 9ᵃ are connected to the starting fuses 10, 11, 12 respectively. The running terminals 13ᵃ, 14ᵃ and 15ᵃ are electrically connected to the running fuses 16, 17 and 18 respectively. The fuses 10 and 16 are electrically connected to one of the supply conductors 120 the fuses 11 and 17 are connected to another of the supply conductors 121, and the fuses 12 and 18 are electrically connected to another of the supply conductors 122. These conductors 120, 121 and 122 represent the supply conductors of a three wire system. The starting terminals 7ᵇ, 8ᵇ, 9ᵇ are electrically connected together through a conductor 123 and are located on the back of the strips 43. The running terminals 13ᵇ, 14ᵇ, 15ᵇ are also located on the back of the strips. The terminal 13ᵇ is electrically connected through the running fuse 16 to the supply conductor 120. The running terminal 14ᵇ is electrically connected through the running fuse 17 to the supply conductor 121 and the running terminal 15ᵇ is connected to the running fuse 18 to the supply conductor 122.

It is sufficient to state that the arrangement is such that when the connector bars are in contact with their respective starting terminals the current will be supplied through the starting fuses and the coils will be connected in star; and that when the respective bars are in contact with their respective running terminals the current will be supplied through the running fuses and the motor coils will be connected in delta.

Having thus described my invention, what I claim as new, and desire to secure by Letters Patent, is:

1. Apparatus of the class described, comprising a starting terminal, a running terminal, a movable connector for establishing circuit relation with the source of supply, said connector occupying successively at least three positions, to wit: initial, "off" position, starting position (in engagement with said starting terminal) and running position (in engagement with said running terminal), means for yieldingly urging said connector to move from initial position through starting position to running position, retarding means for retarding, the movement of said connector, said retarding means being practically non-active during the movement of said connector from initial to starting position and automatically becoming fully active when said connector has reached starting position, and means for adjusting said retarding means to predetermine the point at which said retarding means shall change from non-active to active condition.

2. Apparatus of the class described, comprising a starting terminal, a running terminal, a removable connector for establishing circuit relation with the source of supply, said connector occupying successively at least three positions, to wit: initial, "off" position, starting position (in engagement with said starting terminal) and running position (in engagement with said running terminal), means for yieldingly urging said connector to move from initial position through starting position to running position, fluid controlled retarding means for retarding the movement of said connector, a valve seating in said retarding means, and adjustable means for rendering said valve non-active during the movement of said connector from initial position to starting position and thereafter permitting said valve to automatically come into action.

3. Apparatus of the class described comprising a starting terminal, a running terminal, a movable connector for establishing circuit relation with the source of supply, means for yieldingly urging said connector to engage said terminals successively, a dash pot and plunger for retarding the movement of said connector, a valve in said plunger for determining the rate of movement thereof, means for holding said valve open during a portion of the travel of said plunger and means for regulating said holding means to thereby regulate the point of closing of said valve.

4. An automatic electric switch comprising a plurality of terminals, a switching connector adapted to engage them *seriatim*, a spring for causing automatic movement of said connector, a dash pot, a plunger in said dash pot mechanically connected to said connector for retarding the movement thereof during certain portions of its travel in a forward direction, a valve in said plunger for controlling the rate of flow therethrough, means for holding said valve open during a predetermined portion of the travel of said plunger, said holding means being adjustable to thereby determine the point at which said valve shall be closed.

5. An automatic electric switch comprising a starting terminal, a running terminal and an elongated terminal opposite to them, a connector bar adapted to connect said elongated terminal with first the starting terminal and then the running terminal and vice versa, and a spring motor for moving said connector, said connector being movable parallel to itself to thereby produce a double break between said connector and the said terminals.

6. An automatic electric switch comprising a starting terminal, a running terminal, an elongated terminal opposite to them, a connector bar movable parallel to itself and adapted to engage said starting and running terminals successively while in engagement with said elongated terminal, a spring device for moving said connector and means for automatically changing the rate of movement of said connector at different portions of its travel.

7. An automatic electric switch comprising a plurality of terminals, a movable connector, a spring device for moving said connector into engagement with said terminals *seriatim*, a rack and pinion for straining said spring, a hand lever for rotating said pinion to thereby strain and release said spring, and a detent for holding said lever in the position desired.

8. Apparatus of the class described comprising a plurality of terminals, a movable connector for establishing the circuit through said terminals, spring motor means for moving said connector, means for setting the spring in said motor means under strain, a plunger mechanically attached to said motor means for controlling the rate of travel of said connector, a valve for permitting the flow of retarding fluid through said plunger, means for normally holding said valve open during a predetermined portion of the travel of said plunger, and a dash pot inclosing said plunger and having an inlet therein behind said plunger and a relief opening at a point forward of said inlet for rapidly admitting the retarding fluid after the plunger has traveled a predetermined distance in said dash pot.

9. Apparatus of the class described comprising a box adapted to contain oil, a plurality of terminals in said box, a connector, a spring device for causing said connector to engage said terminals *seriatim*, a dash pot in said box having an inlet in the bottom, and a plunger in said dash pot mechanically connected to said spring device for retarding the movement of said connector.

In witness whereof, I have hereunto subscribed my name in the presence of two witnesses.

ARTHUR C. McWILLIAMS.

Witnesses:
HOWARD M. COX,
MARGARET D. ROBB.